US007177880B2

(12) United States Patent
Ruvolo et al.

(10) Patent No.: US 7,177,880 B2
(45) Date of Patent: Feb. 13, 2007

(54) METHOD OF CREATING AND DISPLAYING RELATIONSHIP CHAINS BETWEEN USERS OF A COMPUTERIZED NETWORK

(75) Inventors: Joann Ruvolo, San Jose, CA (US); Andrew L. Schirmer, Andover, MA (US); Marijane M. Zeller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/323,566

(22) Filed: Dec. 19, 2002

(65) Prior Publication Data

US 2004/0122855 A1 Jun. 24, 2004

(51) Int. Cl.
*G06F 17/30* (2006.01)
(52) U.S. Cl. ............... 707/104.1; 707/10; 709/203; 709/219
(58) Field of Classification Search ............ 707/5, 707/6, 10, 101, 104.1, 11, 1; 705/7, 8; 709/205–207, 709/203, 219; 715/751, 752, 758, 759, 706
See application file for complete search history.

(56) References Cited

U.S. PATENT DOCUMENTS 5,963,951 A * 10/1999 Collins ................. 707/102
6,052,122 A * 4/2000 Sutcliffe et al. ........... 715/751
6,061,681 A * 5/2000 Collins ..................... 707/5
6,175,831 B1 * 1/2001 Weinreich et al. ......... 707/10
6,269,369 B1 * 7/2001 Robertson .................. 707/10
6,735,568 B1 * 5/2004 Buckwalter et al. ........ 705/1
2003/0220980 A1 * 11/2003 Crane ....................... 709/207

OTHER PUBLICATIONS

Wayback Machine; eHarmony.com; http://web/archive.org/web/20011003190740/www.eharmony.com; 1 page.*
Wayback Machine; eHarmony.com; http://web/archive.org/web/20020802011830/www.eharmony.com; 1 page.*
"Designing and Using Human-Computer Interfaces and Knowledge Based Systems", Gavriel Salvendy and Michael J. Smith, Advances in Human Factors/Ergonomics, 12B, Proceedings of the Third International Conference on Human-Computer Interaction, Boston, Massachusetts, Sep. 18-22, 1989, vol. II, pp. 845-852.

(Continued)

*Primary Examiner*—Leslie Wong
*Assistant Examiner*—Monica Pyo
(74) *Attorney, Agent, or Firm*—Gibb I.P. Law Firm, LLC; Stephen T. Kechane, Esq.

(57) ABSTRACT

A method and structure for identifying potential relationships between users of a computer network is disclosed. The invention extracts relationship information from databases in the computer network in order to establish multiple relationship chains of the users from the relationship information. More specifically, the invention evaluates network information and network communications between the users to produce metrics and processes the metrics to produce contact information. The contact information indicates whether a personal relationship exists between two users. In addition, the invention can produce relationship values representing strengths of social relationships between users of the computer network based on such relationship information.

24 Claims, 2 Drawing Sheets

OTHER PUBLICATIONS

"Memoirs: A Personal Multimedia Information System" M.W. Landsdale, D.R. Young and C.A. Bass, Cognitive Ergonomics Research Group, Department of Human Sciences, Loughborough University of Technology, Loughborough, Leicestershire LE11 3TU, U.K., Sep. 18-22, 1989, pp. 317-327.

"Cooperative Information Agents III", Matthias Klusch, Onn M. Shehory and Gerhard Weiss, Third International Workshop, CIA'99, Uppsala, Sweden, Jul. 31-Aug. 2, 1999 Proceedings, pp. 1651-1652.

"An Agent-Based System for Intelligent Collaborative Filtering", Colm O'Riordan and Humphrey Sorensen,Cooperative Information Agents III, International Workshop, 3rd, Uppsala, Jul. 31-Aug. 2, 1999, CIA '99 Proceedings (Lecture Notes in Artificial Intelligence, vol. 1652) pp. 125-135.

"Introduction to Algorithms", Thomas H. Cormen, Charles E. Leiserson, and Ronald L. Rivest, The MIT Press, Cambridge, Massachusetts, 25.2 Dijkstra's Algorithm, 1989, pp. 525-531.

* cited by examiner

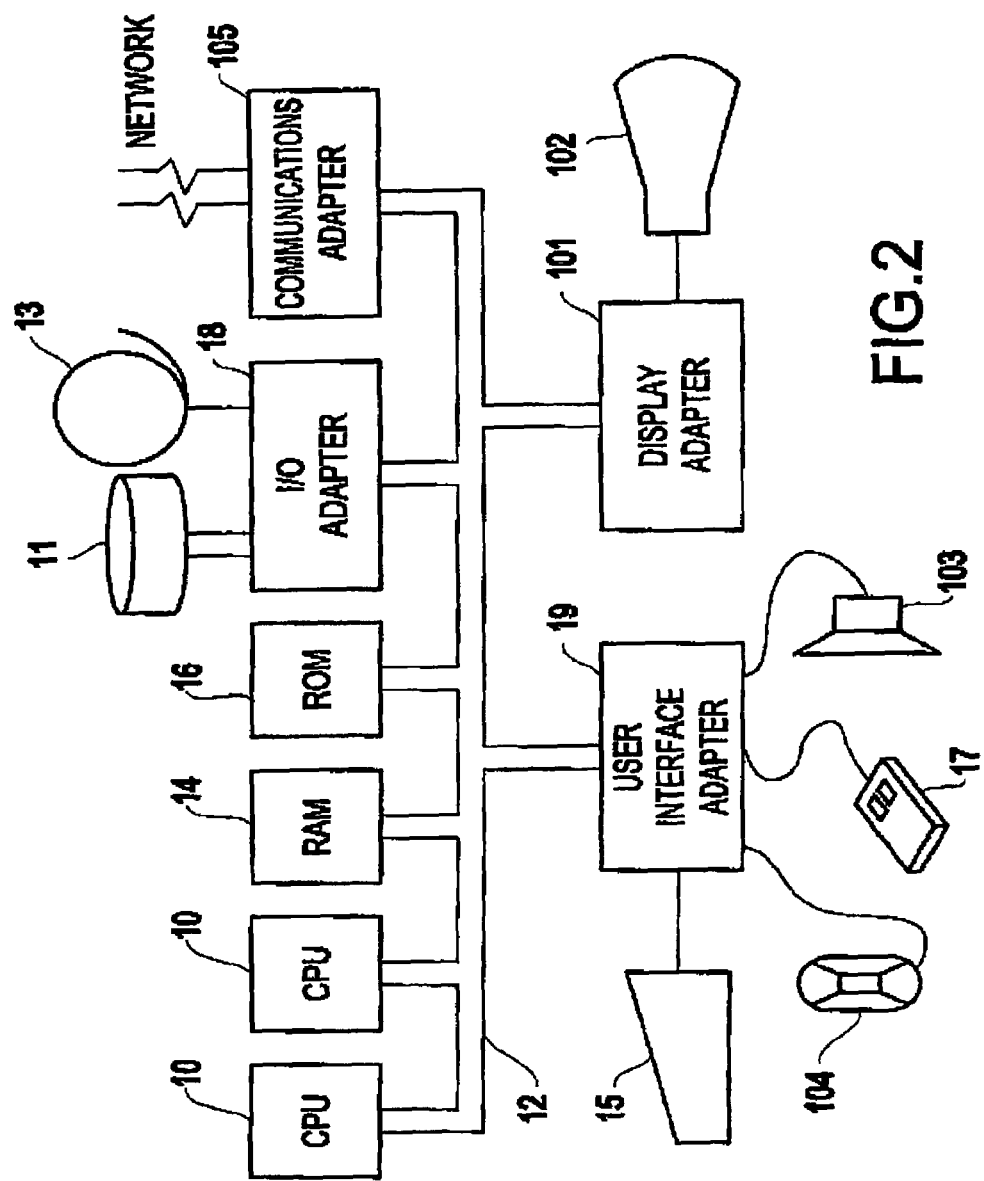

METHOD OF CREATING AND DISPLAYING RELATIONSHIP CHAINS BETWEEN USERS OF A COMPUTERIZED NETWORK

BACKGROUND OF THE INVENTION

1. Field of the Invention

The present invention generally relates to the use of contact information contained within address books, e-mail's, calendars, journals, etc. to identify chains of relationships between users of a computer network and to display such chains in an informative and user friendly manner,

2. Description of the Related Art

In the course of daily work, people make frequent connections to other people for many purposes such as to gain information, advice, approval, make introductions to people they do not know, etc. For such purposes, people go first to people they know, because that is the most efficient thing to do. Establishing a social relationship requires work, so interacting with people for whom that work has already been done saves effort. However, the fact exists that a person often needs something that the people they know cannot provide. To get the information they need, they must establish a new relationship with a person they do not know. The problem then becomes how best to make contact with a person you do not know. Systems already exist that provide information about other people, often in the form of information profiles, but they do not provide mechanisms that help a seeker to meet others in an easy to use and efficient way.

SUMMARY OF THE INVENTION

The invention comprises a method of identifying potential relationships between users of a computer network. The invention extracts relationship information from databases in the computer network in order to establish multiple relationship chains of the users from the relationship information. More specifically, the invention evaluates network information and network communications between the users to produce metrics and processes the metrics to produce contact information. The contact information indicates whether a personal relationship exists between two users. In addition, the invention can produce relationship values representing strengths of social relationships between users of the computer network based on such relationship information.

Then, the invention displays the relationship chains for the seeker to view. In one embodiment, the invention displays the relationship chains in an order from shortest relationship chain to longest relationship chain. For relationship chains that have the same length, the relationship chains are displayed in an order from the highest relationship strength to the lowest relationship strength. This allows the seeker to select one of the relationship chains that is the most desirable (not necessarily the shortest) relationship chain through the graphic user interface.

To make the chains, the invention finds intersections between contacts of a first user of the network and contacts of a second user of the network. If this process is unsuccessful, a second process of finding intersections between second order contacts of a first user of the network and second order contacts of a second user of the network is performed. The second order contacts are contacts of users contained in the primary user's contact list. This process can expand to third, fourth, fifth, etc. order contacts, which could eventually extend to all user of the network.

The invention is used to establish the most desirable relationship chain from the first user to the second user. Therefore, all of the relationship chains begin with the first user and end with the second user. The only difference between the relationship chains is that different computer network users lie in the chains between the first user and the second user.

The invention takes into account the real human processes required to make contact with another person and discloses an optimization that makes the process of connecting shorter and simpler. In so doing, the information presented becomes easier to understand, easier and quicker to use, and makes it more likely that the user will succeed in making a successful contact, all of which benefit the system user. To maximize the ease and effectiveness of making contact with another person, the invention provides to the seeker the intermediary contacts on the "shortest" path (as opposed to the "best path"), and further orders the contacts according to one or more criteria designed to identify the best contacts for the particular circumstances of the search.

BRIEF DESCRIPTION OF THE DRAWINGS

The invention will be better understood from the following detailed description of preferred embodiments of the invention with reference to the drawings, in which:

FIG. 2 is a hardware embodiment of the invention.

DETAILED DESCRIPTION OF PREFERRED EMBODIMENTS OF THE INVENTION

Figure 1:
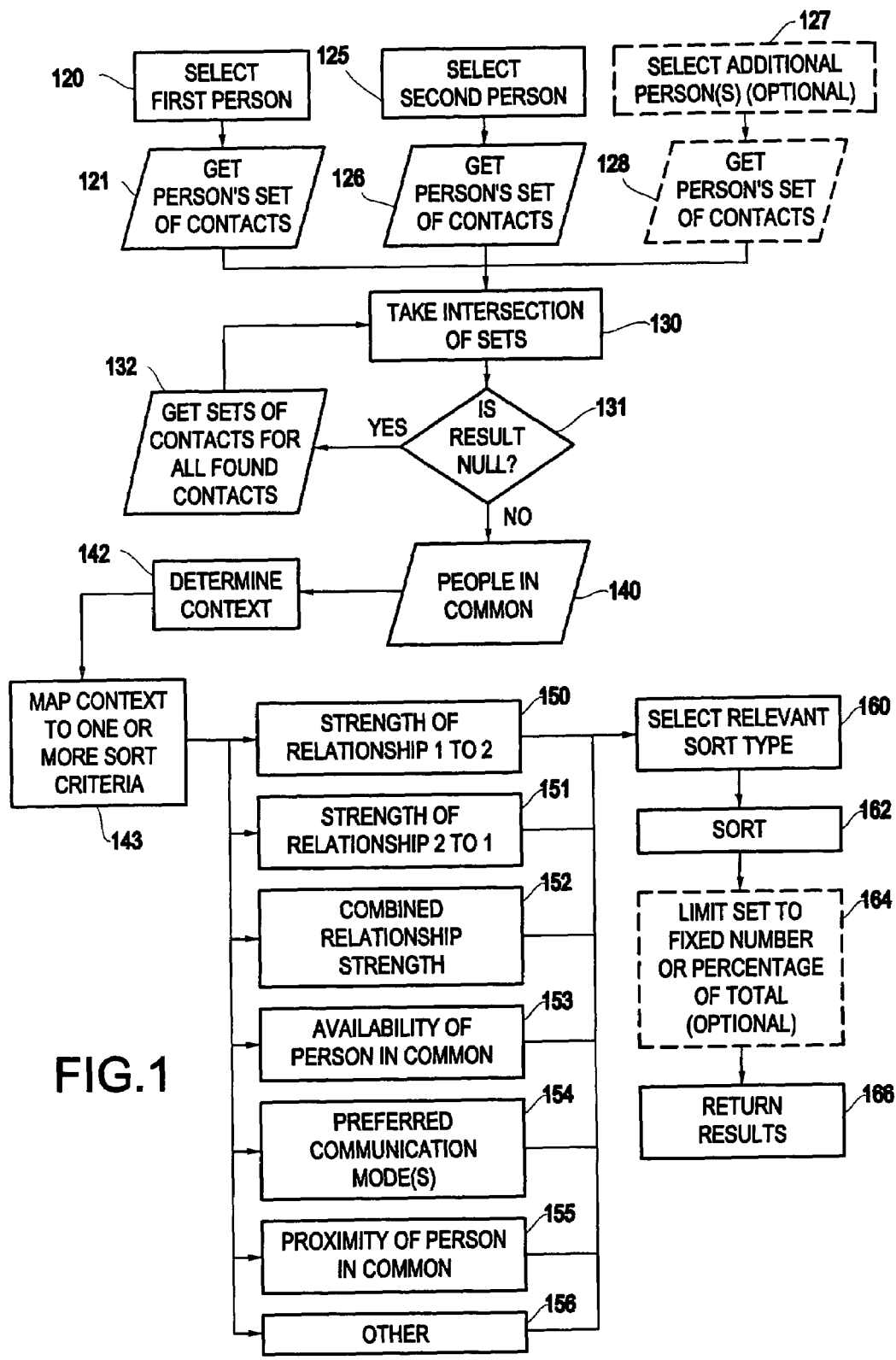
FIG. 1 is a flow diagram illustrating a preferred method of the invention.

Systems that display information about people generally do so in a generic fashion rather than in a way that makes personal sense to the system user. Further, as discussed above, it is difficult to discover how best to make contacts with people you do not know. Systems already exist that provide information about other people, often in the form of information profiles, but they do not provide mechanisms that help a seeker to meet others in an easy to use and efficient way. There is substantial benefit in having a view of people that is personal and augments a user's natural decision-making about whether to connect to a given person.

The invention establishes potential relationships between users of a computer network and displays such information as a relationship chain, which is a series of names (or other identifiers) of people who know each other indirectly through the other people. An example of a chain of relationships would be Person A who knows Person B who knows Person C who knows Person D. A does not initially know C or D. To meet D, A must first use her connection to B to meet C, and then use that connection to meet D. There might be other paths between A and D, some shorter, some longer, some the same length. The "best path" is defined as the one, regardless of its length, that has the best composite value of quality of relationships.

The shortest path possible is one degree of separation. That is, there is only one person between the seeker and the target person the seeker wishes to contact. However, it may be that the seeker and target have no such person or persons in common at one degree, in which case the next shortest path (two, or more, intermediaries) may be used.

For each person in the chain that the seeker does not yet know (all but the first person), the seeker must establish a relationship, which requires an expenditure of time and energy. The intermediary person being contacted may be unavailable, unresponsive, or unreceptive. The more people in the chain, the more risk exists that a seeker will not successfully traverse the chain. The extra effort required for each step also takes time away from the seeker's other tasks and goals, often being enough of a disincentive to make them avoid it entirely and instead sacrifice the advantages of making the connection. The invention described below helps to solve these problems.

A novel system of automatically calculating the relationship metrics between network users is disclosed in co-pending U.S. patent application Ser. No. 10/323,568 entitled "Detect and Qualify Relationships Between People and Find the Best Path Through the Resulting Social Network" hereinafter referred to as "co-pending application", that is being filed simultaneously herewith and that is fully incorporated herein by reference.

Briefly, the system disclosed in the co-pending application is a social network analysis of looking at how people interact. By being able to understand the interaction patterns between data stored in databases, it becomes possible to more quickly find who might be able to answer questions, understand the impact of organizational change initiatives, and find who serves as bridges between different parts of an organization.

Social networks and the analysis of them have been of interest for quite a while. The results of any analysis are dependent upon the social network data and the inferences drawn from that data. The co-pending application discloses a social network dynamically built and based on the interactions of individuals extracted from the records of their daily lives. These records primarily include data sources commonly found in and/or associated with Personal Information Management (PIM) systems, as well as phone logs, and proximity reports. These PIM data sources include a calendar, a to-do list, a journal, an address book, e-mail, etc. They are valuable sources of information because people use them to record their activities, tasks, and impressions, to organize their contacts, and to correspond. Interactions based on these activities and correspondence can be identified. Phone logs provide the phone number of the caller, and thus reveal possible interactions between the individuals associated with these phone numbers. For individuals who are tracked and choose to be tracked, the proximity records contain the encounters of those individuals detected to be within close proximity of each other.

These data sources of our daily life are primary sources of data. In addition to reflecting our current state, they provide history and even a glimpse into the future (e.g., scheduled meetings). They have been largely overlooked as a source of information.

The system of the co-pending application extracts the raw data from these daily-life sources to detect interactions among people (e.g., how often they meet, the last time they exchanged correspondence). It then makes inferences to detect as well as to qualify relationships between them. A relationship is qualified by assigning a value to it, based on the following attributes that the co-pending application defines for a relationship; longevity (how long have they been connected); currency (have they connected recently); frequency (how often do they connect); exclusivity (how exclusive is the connection (e.g., one-to-one vs. one-to-many, secure content); complexity (is the connection on many levels and on specific contexts); and reciprocity (is the connection mutual or just one-way).

The co-pending application describes a system that extracts data from several daily life sources to build a social network of its users based on their interactions with others. Some aspects of the co-pending application are providing a definition of a relationship (see attributes above), discovering that a relationship exists between two people, qualifying that relationship (i.e., defining its value) given the defined relationship attributes, dynamically building a social network based on these discovered relationships, and calculating the shortest and best paths through the social network given the quality of the relationships.

Additional aspects of the co-pending application are its use of primary data sources, that by the definition of their function (e.g., a calendar), provide a wealth of current and accurate information, without the added burden on its users to create artificial entries. The co-pending application can also qualify connections between people (e.g., this is a complex relationship), rather than just quantify them (e.g., a relationship exists because the parties have had n meetings).

Users that choose to use or are required to use a PIM system, by the nature of the entries, provide valuable information about themselves and those they interact with. Since PIMs are an integral part of many people's lives, the data in them is likely to be relevant, accurate, and current. This data provides a good basis for detecting relationships. One benefit of such a system is its ability to qualify the relationships between people by making inferences from the raw data. This knowledge of the strength of relationships mapped onto a relationship social network provides an effective communication path that benefits individuals, organizations, and even commerce. These features can be determined by discovering the individual's relationship attributes with the parties concerned. On an individual level, a person could use their social network to examine the characteristics of their own social network.

The present invention is concerned with how well two parties know each other and defines several relationship attributes in an attempt to qualify a relationship. The strength of a relationship is determined on the basis of several algorithms that calculate the precise values of these relationship attributes. Not only does the co-pending application detect a relationship, but also it rates the relationship based on relationship attributes.

As explained in the co-pending application, the system evaluates whether a user is a direct or indirect correspondence recipient as reflected by the address book information or the e-mail information. The system also evaluates times of events and users involved in events to establish relationships between the users. The system further evaluates the time of day of event or e-mails to establish whether a relationship is personal or business related. The disclosed system in the co-pending application can apply different weights the address book information, the calendar information, the event information, the to-do list information, the journal information, and the e-mail information to calculate the relationship ratings. When the invention identifies relationships between users of a computerized network, the invention extracts information from address books in the network and evaluates the information to produce relationship ratings of the users of the network.

FIG. 1 illustrates one embodiment of the invention. Item 120 represents one person in the relationship chain. More specifically, in this example, item 120 represents the seeker (e.g., the person desiring to make contact with another person). Item 125 represents the target (e.g., the person to whom the seeker 120 eventually desires to make contact. The invention can also include additional persons 127 to which the seeker 120 desires to make contact. Note that the system is not restricted to just two people. Any number might be used, but the greater the number, the less likely it is that they will all have a person that they all know. This makes it more likely that the system will have to go beyond one degree of separation (e.g., one order of contact sets).

Items 121, 126, and 128 represent each individual person's set of contacts. The invention evaluates network information and network communications between the users to produce metrics and processes the metrics to produce such contact information 121, 126, 128. The contact information indicates whether a personal relationship exists between two users. In addition, the invention can produce relationship values representing strengths of these social relationships (contacts) based on such relationship information. Thus, the invention automatically (and without user intervention) extracts a large number of different types of metrics from the information contained within a computer network. From these metrics, the invention is able to establish a set of contacts that indicate that a personal relationship exists between the first person 120, second person 125, and the third person 127 and the people and their respective contacts sets 121, 126, 128. Therefore, each set of contacts 121, 126, 128 comprises a list of network users who have a personal relationship with the corresponding user 120, 125, 127.

In item 130, the invention takes the intersection of the various contacts sets to establish a chain of relationships. Therefore, if a specific user (e.g., user A) were contained in both contact set 121 and contact set 126, the relationship chain would comprise the first person 120, user A, and the second person 125. This three person relationship chain is the shortest possible relationship chain (considering that the premise of the problem is that the first person 120 does not have a personal relationship with the second person 125).

However, there may not be at an intersection between the contacts 121 of the first person 120 and the contacts 126 of the second person 125. Therefore, in item 131, if there is not an intersection, the invention looks to second order contacts in item 132. The second order contacts are contacts of the contacts. Thus second order contacts are contacts of users contained in the primary user's contact lists 121, 126, 128.

This process can expand to third, fourth, fifth, etc. order contacts, which could eventually extend to all user of the network. Each time an additional order of contacts is added to the analysis, more people are added to each of the relationship chains, thereby making the relationship chains longer. The invention can optionally find intersections and of a specific number of orders of contacts (e.g., specific degrees of separation). Therefore, the invention could be set to always proceed from item 131 to item 132 until a specific order level was reached. Thus, for example, the invention could always process to the third order of contacts (e.g., third degree of separation). In this situation, the invention may find contact chains of three people for the first degree of separation (in item 130) as well as contact chains of five people and seven people (in item 132) as the additional two orders of contact layers (second and third degree of separation) are evaluated. Therefore, the invention can produce multiple relationship chains having multiple lengths, which is represented by item 140.

In item 142 the invention determines the context of the various contacts (personal, business, corporate division, customer, supplier, etc.) and item 143 sorts the relationship chains according to context or other sort criteria. Items 150–152 evaluate the strengths of the various relationships in the chain (backwards and forwards (items 150, 151)) as well as the combined relationship strengths of all relationships (item 152) according to any standardized metric.

In items 153 and 155, the invention uses the metrics extracted from the network information to determine the availability/proximity of the person in common. The person in common is one of the people who make up the center length(s) of the chain (someone other than the beginning or the end of the chain). Therefore, the invention can determine the physical location of the person in common to evaluate whether they have a close physical proximity to the seeker. Similarly, the invention can evaluate how busy the person in common's schedule is to determine whether it is realistic to expect to obtain an appointment with that person. Such information is also maintained with respect to the target 125.

Further, the invention provides the preferred communications modes of the people who make up the relationship chains, as shown by item 154. This information is again extracted from the metrics derived from the network information. For example, one user may heavily rely upon electronic communication, another may heavily rely upon telephonic communication, while others rely upon personal meetings. This information is derived from the above mentioned metrics that include meetings times and places, telephone records, e-mail records, address books, etc. In addition, the invention can include what ever other information may be pertinent (and available from the metrics) given the specific situation being addressed, as shown by item 156.

In item 160, the invention provides the ability to select how the various relationship chains will be sorted and shown on the display. In one embodiment, the invention displays the relationship chains in an order from shortest relationship chain to longest relationship chain. For relationship chains that have the same length, the relationship chains are displayed in an order from the highest relationship strength to the lowest relationship strength. This allows the seeker to select one of the relationship chains that is the most desirable (not necessarily the shortest) relationship chain through the graphic user interface. However, the invention also provides the seeker the ability to sort on any criteria that the seeker may find of interest. The sorting can be done through programming or conventional graphic user interface sort methodologies.

Item 162 represents the actual sorting process and item 164 allows the user to set a limit on the number of relationship chains that are displayed (based on percentage or fixed number). Item 166 represents the actual display of the relationship chains to the seeker and represents the seeker selecting the most relevant chain or chains.

A representative hardware environment for practicing the present invention is depicted in FIG. 2, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, and input/output (I/O) adapter 18. The I/O adapter connects peripheral devices, such as disk units 11 and tape drives 13, to the bus 12. The user interface adapter 19 connects keyboard 15, mouse 17, speaker 103, microphone 104, and/or other user interface devices such as touch screen device (not shown) to the bus 12. The communication adapter 105 connects the information handling system to a data processing network. The display adapter 101 connects the bus 12 to the display device 102. A program storage device readable by the disk or tape units, is used to load the instructions which operate the invention also loaded onto the computer system.

Therefore, as shown above, the invention automatically (and without user intervention) extracts information from the computer network (from sources such as address book information, calendar information, event information, to-do list information, journal information, e-mail information, etc.) in order to produce metrics that are used to develop sets of contacts for each share of the users of the computer network. The metrics are also useful for calculating the strengths of the various relationships contained in the sets of contacts.

The invention then finds intersections between the sets of contacts to establish relationship chains. Rather than locating a "best" relationship chain, the invention provides the user with a number of potential relationship chains in the order from shortest relationship chain to longest relationship chain. Chains of the same length are sorted according to the strengths of the relationships within the relationship chains. Alternatively, the chains can be sorted according to different features that the seeker may find useful. The ordering of the chains is a substantial benefit of the system, but is not required. An unordered result set is still of use to the seeker, who can apply their own awareness of the attributes of the people in common to decide which to use as intermediaries. By presenting the seeker with a number of different possible relationship chains, the invention allows the seeker to use their own intuition to make a final decision as to which relationship chain is the most desirable.

The invention takes into account the real human processes required to make contact with another person and discloses an optimization that makes the process of connecting shorter and simpler. In so doing, the information presented becomes easier to understand, easier and quicker to use, and makes it more likely that the user will succeed in making a successful contact, all of which benefit the system user. To maximize the ease and effectiveness of making contact with another person, the invention provides to the seeker the intermediary contacts on the "shortest" path (as opposed to the "best path"), and further orders the contacts according to one or more criteria designed to identify the best contacts for the particular circumstances of the search.

In any circumstance involving people, the best way to facilitate the acquisition or exchange of information is for people to communicate with each other. When the people have never connected, establishing a relationship is necessary for the communication to take place. The invention provides a mechanism that greatly enhances the speed and efficiency of establishing a relationship. It does so using existing relationships as a bridge. As mentioned above, the shortest path method helps the primary user connect to a target user with less actual social work (calling, establishing a relationship, moving on) than a "best path" system with more steps.

The invention is suitable to any environment where people work together, so long as it provides the information necessary to derive the social metrics on which this invention depends. In short, the invention makes communicating with strangers easier, faster, and more successful.

While the invention has been described in terms of preferred embodiments, those skilled in the art will recognize that the invention can be practiced with modification within the spirit and scope of the appended claims.

What is claimed is:

1. A method of identifying relationships between users of a computer network, said method comprising:
   extracting information directly from data sources in personal information management systems of said users, wherein said data sources comprise at least one of a calendar, a to-do list, a journal, an address book, e-mails, and a phone log;
   processing said information to detect interactions between said users for detecting relationships between said users;
   producing sets of contacts for each of said users, wherein a set of contacts for a corresponding user comprises a list of other users having a relationship with said corresponding user;
   establishing multiple relationship chains between a first user of said computer network and a second user of said computer network, wherein each relationship chain comprises at least three users and wherein said establishing comprises finding intersections between a first set of contacts of said first user and a second set of contacts of said second user; and
   displaying said multiple relationship chains in an order based on a criteria.

2. The method in claim 1, wherein said establishing further comprises, if said finding process is unsuccessful, a second process of finding intersections between second order contacts of said first user of said computer network and second order contacts of said second user of said computer network,
   wherein said second order contacts of said first user comprise contacts of users contained in said first user's contacts; and
   wherein said second order contacts of said second user comprise contacts of users contained in said second user's contacts.

3. The method in claim 1, wherein all of said multiple relationship chains begin with said first user and end with said second user.

4. The method in claim 1, wherein a difference between said multiple relationship chains comprises different computer network users between said first user and said second user.

5. The method in claim 1, further comprising selecting one of said multiple relationship chains as a most desirable relationship chain based upon first user input.

6. The method in claim 1, wherein said criteria comprises chain length and wherein said displaying process displays said multiple relationship chains in said order from shortest relationship chain to longest relationship chain.

7. A method of identifying relationships between users of a computer network, said method comprising:
   evaluating network information and network communications between said users to produce metrics, wherein said network information comprises data sources in personal information managements systems of said users and does not comprise entries made for said computer network and wherein said metrics comprise at least one of times and places of meetings, telephone records, email records, and address books;
   processing said metrics to produce contact information, wherein said contact information indicates whether personal relationships exists between said users;
   producing sets of contacts for each of said users, wherein a set of contacts for a corresponding user comprises a list of other users having a relationship with said corresponding user;
   establishing multiple relationship chains between a first user of said computer network and a second user of said computer network, wherein each relationship chain comprises at least three users and wherein said establishing comprises finding intersections between a first set of contacts of said first user and a second set of contacts of said second user; and displaying said multiple relationship chains in an order based on a criteria.

8. The method in claim 7, wherein said establishing further comprises, if said finding process is unsuccessful, a second process of finding intersections between second order contacts of said first user of said computer network and second order contacts of said second user of said computer network, wherein said second order contacts of said first user comprise contacts of users contained in said first user's contacts; and wherein said second order contacts of said second user comprise contacts of users contained in said second user's contacts.

9. The method in claim 7, wherein all of said multiple relationship chains begin with said first user and end with said second user.

10. The method in claim 7, wherein a difference between said multiple relationship chains comprises different computer network users between said first user and said second user.

11. The method in claim 7, further comprising selecting one of said multiple relationship chains as a most desirable relationship chain based upon first user input.

12. The method in claim 7, wherein said criteria comprises chain length and wherein said displaying process displays said multiple relationship chains in said order from shortest relationship chain to longest relationship chain.

13. A method of identifying relationships between users of a computer network, said method comprising:

extracting information directly from data sources in personal information management systems of said users, wherein said data sources comprise at least one of a calendar, a to-do list, a journal, an address book, e-mails, and a phone log;

processing said information to detect interactions between said users for detecting relationships between said users;

producing sets of contacts for each of said users, wherein a set of contacts for a corresponding user comprises a list of other users having a relationship with said corresponding user;

producing relationship values representing strengths of each of said relationships, wherein said relationship values are based on at least one of longevity, currency, frequency, exclusivity, complexity and reciprocity of said relationships;

establishing multiple relationship chains between a first user of said computer network and a second user of said computer network, wherein each of said multiple relationship chains comprises a plurality of said relationships that link at least three users and wherein said establishing comprises finding intersections between a first set of contacts of said first user and a second set of contacts of said second user; and displaying said multiple relationship chains in an order that is based in part upon said strengths of said relationships in said multiple relationship chains.

14. The method in claim 13, wherein said displaying process displays said multiple relationship chains in an order from shortest relationship chain to longest relationship chain, and for relationship chains that have the same length, relationship chains are displayed in an order from highest relationship strength to lowest relationship strength.

15. The method in claim 13, wherein said establishing further comprises, if said finding process is unsuccessful, a second process of finding intersections between second order contacts of said first user of said computer network and second order contacts of said second user of said computer network, wherein said second order contacts of said first user comprise contacts of users contained in said first user's contacts; and wherein said second order contacts of said second user comprise contacts of users contained in said second user's contacts.

16. The method in claim 13, wherein all of said multiple relationship chains begin with said first user and end with said second user.

17. The method in claim 13, wherein a difference between said multiple relationship chains comprises different computer network users between said first user and said second user.

18. The method in claim 13, further comprising selecting one of said multiple relationship chains as a most desirable relationship chain based upon first user input.

19. A program storage device readable by machine, embodying a program of instructions executable by the machine to perform a method of identifying relationships between users of a computer network, said method comprising:

extracting information directly from data sources in personal information management systems of said users, wherein said data sources comprise at least one of a calendar, a to-do list, a journal, an address book, e-mails, and a phone log;

processing said information to detect interactions between said users for detecting relationships between said users;

producing sets of contacts for each of said users, wherein a set of contacts for a corresponding user comprises a list of other users having a relationship with said corresponding user;

establishing multiple relationship chains between a first user of said computer network and a second user of said computer network, wherein each relationship chain comprises at least three users and wherein said establishing comprises finding intersections between a first set of contacts of said first user and a second set of contacts of said second user; and displaying said multiple relationship chains in an order based on a criteria.

20. The program storage device in claim 19, wherein said establishing further comprises, if said finding process is unsuccessful, a second process of finding intersections between second order contacts of said first user of said computer network and second order contacts of said second user of said computer network, wherein said second order contacts of said first user comprise contacts of users contained in said first user's contacts; and wherein said second order contacts of said second user comprise contacts of users contained in said second user's contacts.

21. The program storage device in claim 19, wherein all of said multiple relationship chains begin with said first user and end with said second user.

22. The program storage device in claim 19, wherein a difference between said multiple relationship chains comprises different computer network users between said first user and said second user.

23. The program storage device in claim 19, wherein said method further comprises selecting one of said multiple relationship chains as a most desirable relationship chain based upon first user input.

24. The program storage device in claim 19, wherein said displaying process displays said multiple relationship chains in an order from shortest relationship chain to longest relationship chain.

* * * * *